Nov. 21, 1967
J. H. MARTEN
3,354,205
UREA SYNTHESIS PROCESS
Filed March 26, 1964
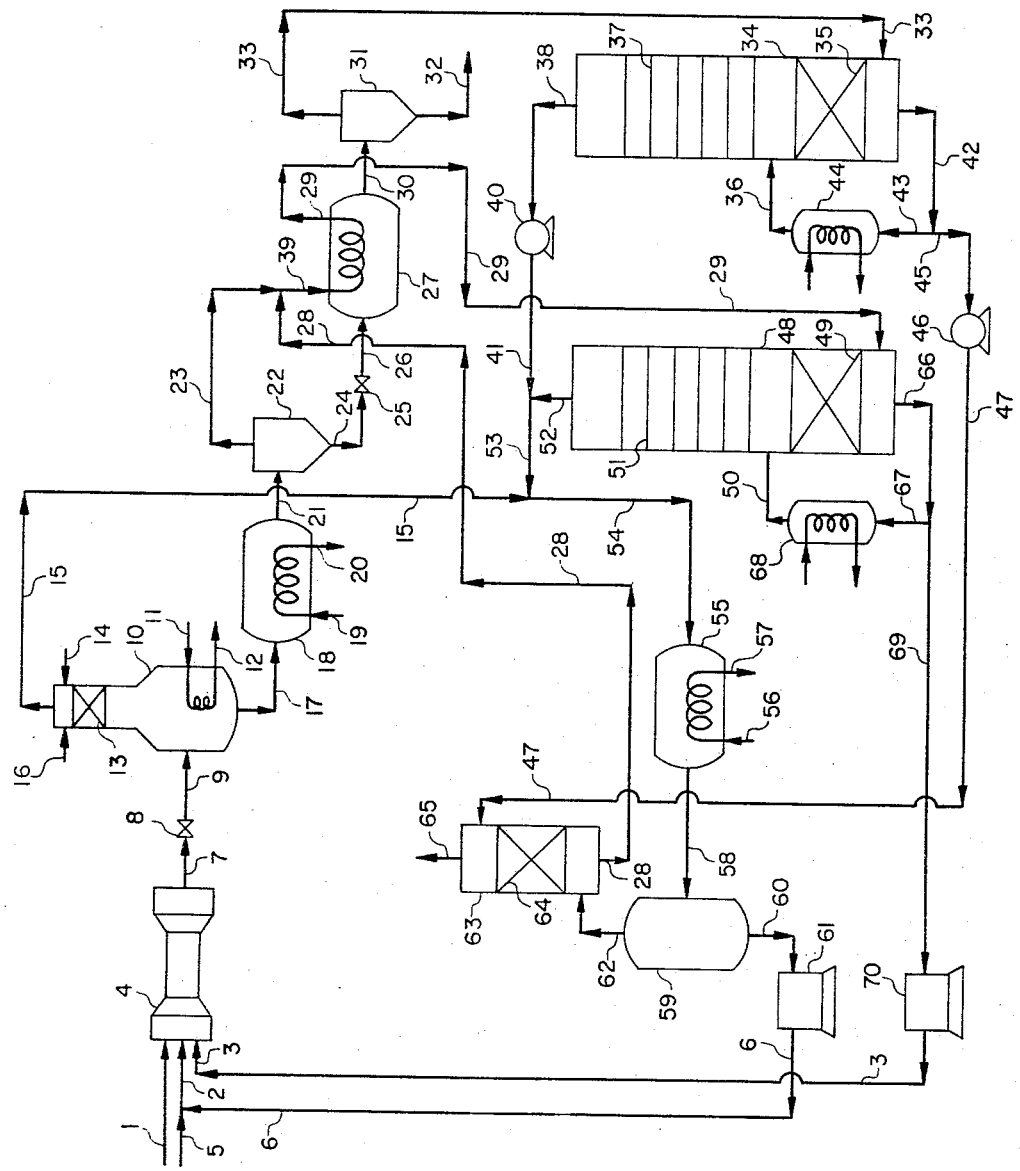
JEROME H. MARTEN
INVENTOR.
BY *J. T. Chaloty.*
AGENT

United States Patent Office 3,354,205
Patented Nov. 21, 1967

3,354,205
UREA SYNTHESIS PROCESS
Jerome H. Marten, Nixon, N.J., assignor to Chemical Construction Corporation, New York, N.Y., a corporation of Delaware
Filed Mar. 26, 1964, Ser. No. 354,983
2 Claims. (Cl. 260—555)

The present invention relates to the synthesis of urea, by the reaction of ammonia and carbon dioxide at elevated pressure. An improved complete recycle procedure is provided, which features an improved method for the economical removal of inerts from the system. It has been determined that essentially complete recovery of ammonia vapor from the vented inerts may be successfully accomplished by scrubbing the inerts with pressurized aqueous ammonium carbamate solution, derived from a later stage of the complete recycle process.

Inert gases such as nitrogen and argon are mainly introduced into the urea synthesis system as dissolved components in the ammonia and carbon dioxide feed streams. In some cases inerts are introduced when air is injected into the synthesis autoclave as a corrosion prevention measure. In any case, in a complete recycle urea synthesis process the problem of disposal of inerts is encountered, since the unreacted process components are totally recycled to the synthesis autoclave. Thus, if provision is not made for inerts removal these components will build up in the process circuit and reduce process efficiency.

The main point at which inerts may be removed from the synthesis circuit is during recycle of unconverted excess ammonia, derived as a gas stream containing inerts. This ammonia stream containing inerts has been treated for inerts removal in the prior art by first compressing and cooling the gas stream, to condense most of the ammonia into a liquid phase. The residual gas phase is then separately refrigerated, to condense most of the residual ammonia as liquid, and the residual gas phase consisting mostly of inerts plus a minor proportion of residual ammonia is vented to atmosphere. The refrigeration system requires costly apparatus, including a main vent gas-liquid heat exchanger, compressor for vaporized refrigerant, and compressed refrigerant heat exchanger. Substantial operating costs in terms of electric power and cooling water consumption are also encountered with this system. In addition, the recovery of ammonia is not complete and a small loss of residual uncondensed ammonia always takes place.

In the present invention, it has been determined that pressurized aqueous ammonium carbamate solution derived from the recycle circuit of the urea synthesis system is a highly efficient absorbent for the ammonia vapor. Aqueous ammonium carbamate solution is available in the complete recycle urea synthesis process, and is produced by cooling and scrubbing of the off-gas derived from the decomposition of ammonium carbamate present in the main urea process effluent from the synthesis autoclave. This aqueous ammonium carbamate solution when produced at a particular pressure level will always contain a substantial or equilibrium content of dissolved free ammonia. However, when the solution is pressurized to a higher pressure level, its capacity for absorption of free ammonia is substantially increased. Thus, in the present invention the recycle ammonia vapor containing inerts is cooled at a relatively elevated pressure, to condense a major portion of the ammonia to the liquid phase, and the residual gaseous phase consisting of ammonia vapor and inerts is scrubbed with pressurized aqueous ammonium carbamate solution. The aqueous solution absorbs most of the ammonia vapor from the gaseous phase, and the residual inerts stream is vented to atmosphere. The absorption takes place in a simple packed scrubber or other gas-liquid contact apparatus. The aqueous solution containing dissolved ammonia is then returned into the complete recycle procedure, thus returning the dissolved ammonia into the system.

The method of the present invention possesses several advantages. A more complete recovery of ammonia is attained and ammonia losses are substantially reduced, because the final vented inerts contain only a very small proportion of residual ammonia vapor. This result is achieved because the pressurized aqueous absorbent solution has a surprisingly high absorptive capacity for ammonia vapor. In addition, capital costs are significantly reduced, because the only capital expense is the cost of a relatively simple packed gas scrubbing tower and accessory controls. Finally, operating costs are also sharply reduced, since the operating expense for a gas scrubber are substantially less than the electric power and cooling water costs for a conventional refrigeration system.

It is an object of the present invention to remove inerts from a complete recycle urea synthesis process in an improved manner.

Another object is to more completely recover ammonia vapor during the venting of inerts from a complete recycle urea synthesis process.

A further object is to provide a more efficient complete recycle urea synthesis process.

An additional object is to utilize aqueous ammonium carbamate solution, formed in a complete recycle urea synthesis process, in an improved method for elimination of inerts from the recycle system.

Still another object is to provide an improved method for separation of ammonia vapor from inerts being discharged from a complete recycle urea synthesis process.

These and other objects and advantages of the present invention will become evident from the description which follows. Referring to the figure, a flow diagram of a complete recycle urea synthesis process embodying the method of the present invention is presented. Carbon dioxide feed stream 1, combined ammonia feed stream 2 and recycle aqueous ammonium carbamate feed stream 3 are passed into urea synthesis autoclave 4. Ammonia feed stream 2 is composed of fresh input ammonia stream 5 and recycle ammonia stream 6, derived from within the process. Feed streams 1 and 5 will generally contain a small proportion of inerts. Thus, stream 5 as derived from an ammonia synthesis facility may contain a small portion of dissolved nitrogen, hydrogen and argon.

The feed streams 1, 2 and 3 are passed into autoclave 4 at an elevated pressure, typically in the range of 2000 p.s.i.g. to 6000 p.s.i.g. The overall molar ratio of ammonia to carbon dioxide in the combined feed streams within autoclave 4 is generally maintained between about 4 to 1 and 10 to 1, and preferably at 6 to 1, so as to provide considerable excess of ammonia and thereby achieve high conversion to urea. The temperature in autoclave 4 is the equilibrium temperature attained under the particular process conditions, generally between about 320° F. and 430° F. Under these process conditions, reaction takes place between the feed streams resulting in the synthesis of urea.

The process effluent stream 7 derived from autoclave 4 contains urea, unconverted ammonium carbamate, excess ammonia, water and dissolved inerts. Stream 7 is first passed through pressure reducing valve 8. The pressure of the effluent stream is thus reduced to a lower level in the range of 200 p.s.i.g. to 400 p.s.i.g., and the effluent stream 9 of lowered pressure is passed to excess ammonia separation vessel 10. The function of vessel 10 is to remove excess ammonia from stream 9 as a pure off-gas, however, in instances when the overall molar ratio of ammonia to carbon dioxide in stream 9 is 4 to 1 or less, vessel 10 may be omitted and its function performed by processing units to be described infra. The details of operation of vessel 10 are described in U.S. Patents Nos. 2,894,878 and 2,716,629, and therefore the operation of vessel 10 will now be described only in general terms.

The process effluent stream 9 enters the lower portion of vessel 10 and is heated by an internal steam coil, with steam input via 11 and condensate removal via 12. The heating removes excess free ammonia as an off-gas which rises through the upper packed column section 13 of vessel 10. The ammonia gas stream contains a small amount of carbon dioxide, which is removed by scrubbing the gas stream with liquid ammonia reflux 14 which is produced by cooling and condensing a small portion of the final ammonia off-gas stream 15, not shown. A small quantity of water is also admitted via 16 to prevent the formation of solid ammonium carbamate deposits in packed section 13. Cooling coils, not shown, may be provided in the upper section of vessel 10 for temperature control. An ammonia off-gas stream 15 containing inerts but substantially free of water vapor and carbon dioxide is removed from the top of vessel 10, and processed in a manner to be described infra for inerts removal and recycle of pure ammonia to urea synthesis.

Referring now to the lower portion of vessel 10, the residual liquid effluent stream, now with lowered ammonia content, is removed via 17 and passed into ammonium carbamate decomposer 18. Unit 18 is typically a shell and tube heat exchanger, and is shown schematically as provided with a steam heating coil with steam entry via 19 and condensate removal via 20. The function of unit 18 is to decompose ammonium carbamate present in stream 17 by heating, which liberates ammonia and carbon dioxide and thereby forms a gas phase. A mixed gas-liquid process stream 21 is removed from vessel 18, and is passed into decomposer separator vessel 22. Unit 22 is a known type of gas-liquid separator, preferably a gravity separator of the cyclonic type. The mixed off-gas is removed from vessel 22 via 23, while the residual liquid stream is removed via 24 and passed through pressure reducing valve 25, which serves to lower the liquid stream pressure to a final level between about 5 p.s.i.g. to 50 p.s.i.g.

The resulting liquid stream 26, now at reduced pressure and consisting primarily of an aqueous urea solution with a silent amount of residual ammonium carbamate and free ammonia, is passed through low pressure ammonium carbamate decomposer vessel 27, which has a function and mode of operation similar to unit 18 described supra. The heating coil of vessel 27 may be provided with steam, however heating in unit 27 is preferably provided by the reaction of the first stage off-gas 23 with aqueous ammonium carbamate solution stream 28, derived from within the process in a manner to be described infra. Streams 23 and 28 are mixed together to form mixed gas-liquid stream 39, which then passes through the coil of unit 27. The gas-liquid mixing of streams 23 and 28 is preferably attained in the manner described in U.S. patent application No. 37,641 filed June 21, 1960, now U.S. Patent No. 3,147,304. The reaction of stream 23 and 28 within the coil of unit 27 generates heat, which causes the final decomposition of ammonium carbamate in the process stream. A mixed gas-liquid stream of reduced heat content is thus removed from the coil of unit 27 via 29. This general concept of heat exchange and recovery is described in detail in U.S. patent application No. 8,009, filed Feb. 11, 1960, now U.S. Patent No. 3,137,725. The temperature of the urea-containing process stream within unit 27 is thus preferably maintained between about 180° F. to 250° F., and at this temperature level and under the reduced pressure condition, the balance of residual ammonium carbamate is decomposed with minimum biuret formation.

The resulting mixed gas-liquid stream 30 is passed through separator 31, which has a function and mode of operation similar to unit 22 described supra. A final product aqueous urea solution is withdrawn via 32, and passed to product utilization.

The mixed ammonia-carbon dioxide off-gas derived from ammonium carbamate decomposition is removed from separator 31 via 33, and is passed into low pressure condenser-stripper 34. The details of the operation of unit 34 are basically as described in U.S. patent application No. 5,379 filed Jan. 29, 1960, now U.S. Patent No. 3,155,722, and consequently will only be briefly discussed. Unit 34 is provided with lower packed section 35 over which aqueous ammonium carbamate solution 36 is recycled. Input mixed gas stream 33 is scrubbed in packed section 35 at a temperature between about 125° F. to 140° F., whereby the bulk of carbon dioxide present is dissolved in the liquid phase as ammonium carbamate. The balance of residual carbon dioxide content is removed from the gas stream in upper reflux section 37, and a final ammonia gas stream 38 containing inerts and free of carbon dioxide is removed from the top of unit 34 at a temperature below 100° F. Stream 38 is compressed to a higher pressure level in the range of 200 p.s.i.g. to 400 p.s.i.g. by blower 40, and the resulting gaseous stream 41 consisting of ammonia plus inerts is processed in a manner to be described infra for recycle to urea synthesis.

Warmed aqueous ammonium carbamate solution is withdrawn from the bottom of unit 34 via 42, and is divided into two portions. One portion of stream 42 is recycled via 43 to further scrubbing of off-gas, passing through cooler 44 prior to recycle via 36. The balance of stream 42 is passed via stream 45 to pump 46, where the aqueous solution is pressurized to an elevated pressure in the range of 200 p.s.i.g. to 400 p.s.i.g. The pressurized solution 47 is now suitable for usage in the method of the present invention, in a manner to be described infra.

Returning to low pressure ammonium carbamate decomposer 27, the mixed gas-liquid stream 29 derived from the heating coil of unit 27 is passed into the lower section of high pressure condenser-stripper 48, below packed section 49. Unit 48 has a function and operation similar to unit 34 described supra, except that an operating pressure between about 200 p.s.i.g. to 400 p.s.i.g. is maintained in unit 48. The gaseous component of stream 29 separates from the liquid phase in the lower portion of unit 48, and is scrubbed in packed section 49 at a temperature between about 200° F. to 220° F. by recycling aqueous ammonium carbamate solution 50. This scrubbing serves to remove the bulk of carbon dioxide from the gas phase as dissolved ammonium carbamate, and the balance of carbon dioxide is removed from the rising gas stream in upper reflux section 51.

A final ammonia stream containing inerts and free of carbon dioxide is removed from unit 48 via 52 at a temperature below 145° F. and pressure in the range of 200 p.s.i.g. to 400 p.s.i.g. Stream 52 is combined with stream 41 of comparable composition and pressure, and the combined stream 53 consisting of ammonia plus inerts is further combined with ammonia plus inerts off-gas stream 15, and the total combined gas stream 54 is now passed to condenser 55 which is provided with an internal cooling coil. Cooling water is admitted to the coil via 56 and removed via 57. The gas stream is cooled to a temperature in the range of 90° F. to 145° F., and the bulk of contained ammonia is thereby condensed to liquid. The resulting mixed stream 58 consisting of liquid ammonia, residual gaseous ammonia and gaseous inerts is passed to ammonia storage vessel 59. Liquid ammonia is withdrawn from vessel 59 via 60, pressurized in recycle compressor 61 to urea synthesis pressure in the range of 2000 p.s.i.g. to 6000 p.s.i.g., and recycled via 6 to urea synthesis.

The gaseous component consisting of residual ammonia and inerts is withdrawn from vessel 59 via 62, and treated in accordance with the method of the present invention. Thus, stream 62 is passed into gas-liquid contactor 63 below packed section 64, and rises countercurrent to aqueous ammonium carbamate stream 47 which is admitted to unit 63 above packed section 64. The previously pressurized aqueous ammonium carbamate solution 47 has a substantial absorptive capacity for ammonia, and absorbs ammonia from the gaseous phase in packed section 64. The residual inerts stream, now essentially free of ammonia vapor, is discharged via 65 from the top of unit 63. The aqueous absorbent solution containing dissolved ammonia is recovered from the bottom of unit 63 via 28, and recycled to the process as described supra.

Returning now to high pressure condenser-stripper 48, warmed aqueous ammonium carbamate solution is withdrawn from the bottom of unit 48 via 66, and is divided into two portions. One portion of stream 66 is recycled via 67 to further scrubbing of off-gas, passing through cooler 68 prior to recycle via 50. The balance of stream 66 is passed via 69 to recycle compressor 70, where the aqueous ammonium carbamate solution is pressurized to urea synthesis pressure in the range of 2000 p.s.i.g. to 6000 p.s.i.g. and recycled to urea synthesis via 3.

Numerous alternatives within the scope of the present invention will occur to those skilled in the art. Thus, the input liquid ammonia feed stream 5 may alternatively be passed into liquid ammonia storage vessel 59, in order that a portion of the contained inerts may be directly vented via 62. In this case, stream 2 would consist solely of stream 6.

Vessel 10 and its function may be omitted in some cases, such as when the molar feed ratio of ammonia to carbon dioxide is 4 to 1 or less. In this case, relatively less free excess ammonia is present in the main process effluent stream 7, and stream 9 may be directly passed into vessel 18 for ammonium carbamate decomposition. In this case, all of the excess ammonia would be recovered from mixed off-gas as streams 38 and 52.

The aqueous ammonium carbamate solution employed to scrub the ammonia vapor-inerts gas stream 62 may be derived from any suitable point in the process, or from any similar off-gas processing sequence. Thus, for example, a portion of stream 66 could be suitably pressurized so as to attain absorptive capacity for ammonia, and employed in unit 63. In any case, it will be evident that any aqueous ammonium carbamate solution as derived from the scrubbing or condensation of mixed off-gases will contain dissolved ammonia, and thus will have minimal absorptive capacity for further solution of ammonia. An important aspect of the present invention is the fact that the aqueous absorbent solution employed to scrub and recover residual ammonia from vented off-gases must be pressurized in order to attain absorptive capacity for ammonia.

Another alternative commonly employed in the art is to provide dissolved urea in the aqueous ammonium carbamate solutions in the recycle system, in order to provide greater solubility of ammonium carbamate in aqueous solution. In this case, aqueous urea solution derived from stream 32 may be added to stream 42 or 66. In cases where stream 32 is concentrated by evaporation and solid crystal urea is separated from a saturated aqueous mother liquor, the mother liquor high in biuret may profitably be recycled into streams 42 or 66. This would serve to recycle the biuret to the urea synthesis autoclave, in which the biuret will be converted back to urea.

Finally, it should be noted that in cases where the heating in decomposer 27 is attained by means of a steam coil, the process streams may be correspondingly modified. In this case, off-gas stream 23 would be directly passed via 29 into the bottom of unit 48, and stream 28 could be added to streams 66 or 50, or directly recycled to urea synthesis. Another alternative arrangement desirable in some instances would be to only employ a portion of stream 47 in unit 63, in which case the balance of stream 47 could be directly added to off-gas stream 23, or more preferably the balance of stream 47 could first be mixed with stream 28.

An example of an industrial application of the method of the present invention will now be described.

*Example*

An aqueous ammonium carbamate solution derived from the low pressure condenser-stripper of a 75 metric tons/day urea plant was pressurized to 270 p.s.i.g. at 123° F. and passed to a vent gas scrubber-absorber to scrub the vent gases from the ammonia storage tank. Solution flow rate was 5 gallons/minute, and the solution composition (percent by weight) was 27.2 ammonia, 18.4 carbon dioxide, 30.8 urea and 23.6 water.

The vent gas stream was passed to the scrubber-absorber at 79° F. and 210 p.s.i.g., with a total flow rate of 278.6 pounds/hour. Initial composition (pounds/hour) was 50.6 nitrogen, 6.6 hydrogen, 10.4 oxygen, 8.0 methane and 203.0 ammonia. Final composition after scrubbing (final vented gas stream) was the same as initial, except that ammonia content was reduced to 15.0 pounds/hour.

Thus, the total ammonia loss from the facility in the vent gases was 15 pounds/hour. In a conventional refrigeration system for treating the vent gases, the residual ammonia loss is 29 pounds/hour, hence the method of the present invention achieved an extra saving of ammonia of 14 pounds/hour. In addition, capital costs of $5,000 for the refrigeration system and corresponding operating charges (electric power and cooling water) of 5 cents per ton of urea were eliminated.

I claim:

1. In a urea synthesis process in which ammonia and carbon dioxide feed streams and recycled aqueous ammonium carbamate solution are reacted at elevated pressure to form urea, wherein said ammonia is present in excess over the stoichiometric requirement and at least one of said feed streams contains inerts, the reaction effluent stream is heated in a first stage at an intermediate reduced pressure to decompose ammonium carbamate and remove a first mixed ammonia-carbon dioxide off-gas stream containing inerts, the residual effluent stream is further heated in a second stage at a further reduced low pressure to decompose ammonium carbamate and remove a second mixed ammonia-carbon dioxide off-gas stream containing inerts, said mixed off-gas streams are cooled and partially condensed by scrubbing with aqueous ammonium carbamate solutions at their respective pressure levels, the residual off-gas phases are refluxed to remove residual carbon dioxide and produce final off-gas streams of purified ammonia containing inerts, and portions of said aqueous ammonium carbamate solutions are recycled to urea synthesis, the improved method of recycling said purified ammonia streams containing inerts and said aqueous ammonium carbamate solutions to urea synthesis which comprises compressing said low pressure second purified ammonia off-gas to the pressure level of said first purified ammonia off-gas, combining said first and second purified ammonia off-gas streams, cooling the combined off-gas stream to condense a portion of the contained ammonia and form a liquid ammonia phase, separating the residual gaseous phase comprising ammonia and inerts from the liquid ammonia phase, recycling said liquid ammonia phase to urea synthesis, pressurizing a portion of the low pressure aqueous ammonium carbamate solution to the intermediate pressure level of said combined off-gas stream, scrubbing said residual gaseous phase comprising ammonia and inerts with said pressurized aqueous ammonium carbamate solution, whereby ammonia vapor is absorbed from said residual gaseous phase into said aqueous ammonium carbamate solution, discharging said residual gaseous phase essentially comprising inerts after said scrubbing step, and recycling said aqueous ammonium carbamate solution containing dissolved ammonia to urea synthesis.

2. Method of claim 1, in which said aqueous ammonium carbamate solution containing dissolved ammonia is contacted with said second mixed off-gas prior to recycle to urea synthesis, said contact taking place while in heat exchange with the residual effluent stream in the second stage of ammonium carbamate decomposition, whereby said second stage of ammonium carbamate decomposition takes places without provision of heating steam.

No references cited.

HENRY R. JILES, *Primary Examiner.*